United States Patent [19]

Durum

[11] Patent Number: 4,683,427
[45] Date of Patent: Jul. 28, 1987

[54] MAGNETIC GEAR TOOTH SEPARATION DETECTOR

[75] Inventor: Metin M. Durum, Elmhurst, Ill.

[73] Assignee: Borg-Warner Corporation, Chicago, Ill.

[21] Appl. No.: 786,889

[22] Filed: Oct. 11, 1985

[51] Int. Cl.$^4$ .................... G01B 7/14; G01N 27/72; G01R 33/00

[52] U.S. Cl. .................... 324/207; 324/226; 324/239; 74/DIG. 7

[58] Field of Search ............... 324/207, 208, 209, 218, 324/226, 228, 233, 239, 260–262; 340/681, 679, 52 R, 540; 73/660, 593, 162, 661; 310/168, 155; 74/DIG. 7; 250/231 SE, 557; 356/391, 392, 393, 388; 361/243

[56] References Cited

U.S. PATENT DOCUMENTS

| | | | |
|---|---|---|---|
| 2,987,662 | 6/1961 | Jamieson | 361/243 X |
| 3,231,813 | 1/1966 | Vanator | 324/207 |
| 3,370,146 | 2/1968 | Matteucci | 219/68 |
| 3,712,130 | 1/1973 | Weichbrodt et al. | 73/16 C |
| 3,720,870 | 3/1973 | Sueda | 324/239 |
| 4,107,561 | 8/1978 | Schmidt | 310/168 X |
| 4,166,977 | 9/1979 | Glauer et al. | 324/208 X |
| 4,236,094 | 11/1980 | Raymond | 310/168 |
| 4,336,711 | 6/1982 | Maehara et al. | 73/162 |
| 4,447,778 | 5/1984 | Stumm | 324/262 X |

FOREIGN PATENT DOCUMENTS 39761 3/1979 Japan .................... 74/DIG. 7

Primary Examiner—Reinhard J. Eisenzopf
Assistant Examiner—Warren S. Edmonds
Attorney, Agent, or Firm—Julian Schachner; James A. Geppert

[57] ABSTRACT

A gear rattle detector is adapted for use with a gear set having meshing drive and driven gears. The gear rattle detector comprises a magnetic pick-up including a base, a first arm extending from the base and defining a north magnetic pole, a second arm extending from the base and defining a south magnetic pole, and a coil wound around the base. The poles are spaced sufficiently such that they span the root circles of the gears.

6 Claims, 3 Drawing Figures

MAGNETIC GEAR TOOTH SEPARATION DETECTOR

BACKGROUND OF THE INVENTION

This invention relates generally to a gear rattle detector. More particularly it is directed to a gear rattle detector including a magnetic pick-up which detects gear rattle by sensing a break in the magnetic flux path across meshing teeth of a ferrous gear set if the teeth momentarily move out of meshing contact. The gear rattle detector is adapted for use in an automotive transmission having a plurality of gear sets. It is also adapted for use in a laboratory instrument.

A typical gear set includes drive and driven gears having teeth which move into and out of meshing contact as the gears rotate. A tooth on the drive gear moves into contact with a corresponding tooth on the driven gear as the two teeth mesh. In the ideal case, this contact is maintained as the gears rotate from the point of initial contact to the point of final contact, after which continued rotation moves the two corresponding teeth out of mesh. At this time two other corresponding teeth have moved into mesh. Thus at all times there should be contact between corresponding teeth.

As a practical matter, gear teeth must have some backlash and clearance in order that they may be moved into and out of mesh smoothly. Manufacturing tolerances and vibrations in the driveline may cause accelerations and decelerations which may result in momentary separation of the meshing teeth. These conditions normally give rise to some slight gear rattle which generally is acceptable. However, where gear rattle is excessive, noise often becomes objectionable.

In an automotive transmission, for example, several constantly meshed gear sets may be employed. Where objectionable gear rattle is encountered, it often is difficult to isolate the particular gear set causing the problem.

There is a need for a simple gear rattle detector which can determine which gear set develops objectionable rattle and under what operating conditions it is developed. The gear rattle detector should be simple, inexpensive, easy to construct and rugged enough to be incorporated within the transmission itself. It also should be amenable to use in a laboratory instrument.

SUMMARY OF THE INVENTION

This invention is directed to meeting this need. To that end there is disclosed a gear rattle detector adapted for use with a gear set having meshing drive and driven gears. The gear rattle detector comprises a magnetic pick-up including a base, a first arm extending from the base and defining a north magnetic pole, a second arm extending from the base and defining a south magnetic pole, and a coil wound around the base. The poles are spaced sufficiently such that they span the root circles of the gears.

BRIEF DESCRIPTION OF THE DRAWING

The objects and advantages of this invention will become apparent to those skilled in the art upon careful consideration of the specification herein, including the drawing, wherein.

Figure 1:
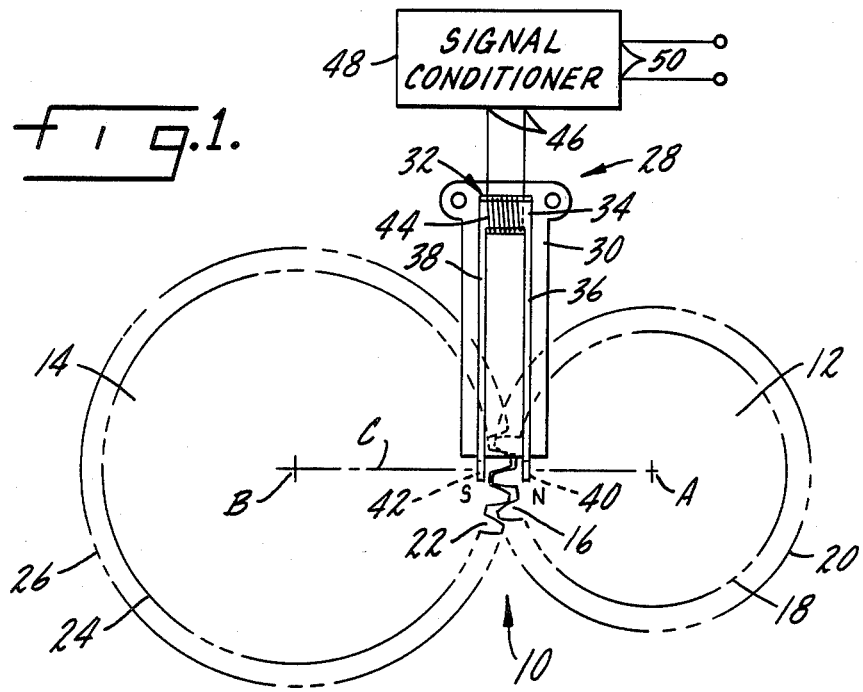
FIG. 1 is a diagrammatic view of a typical gear set and the gear rattle detector of this invention.
Figure 2:
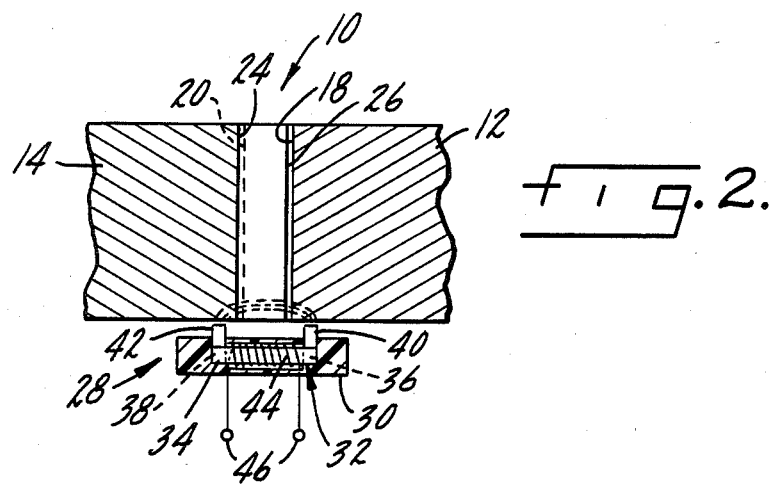
FIG. 2 is a view showing additional details of the gear rattle detector of this invention.
Figure 3:
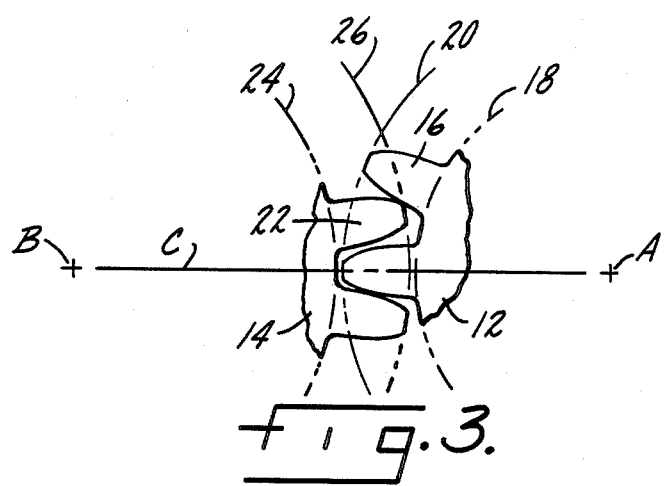
FIG. 3 is a fragmentary diagram showing the relationship of mating gear teeth in a typical gear set.

While this invention is susceptible of embodiment in many different forms, there is shown in the drawing and herein described in detail the preferred embodiment. It should be understood that the present disclosure is considered to be an exemplification of the principles of the invention, and is not intended to limit the invention to this embodiment.

DESCRIPTION OF THE PREFERRED EMBODIMENT

Turning now to the drawing in greater detail, a typical gear set 10 includes a first gear 12 and a second gear 14. Gear 12 is assumed to be the drive gear, with gear 14 the driven gear. Drive gear 12 is rotatable on its axis A. Driven gear 14 is rotatable on its axis B. A line of centers C intersects axes A and B.

Drive gear 12 includes a plurality of drive teeth 16 extending outwardly from its root circle 18 to its tip circle 20. Similarly, driven gear 14 includes a plurality of driven teeth 22 extending from its root circle 24 to its tip circle 26. As is well known in the art, when the gears rotate a drive tooth 16 moves into meshing contact with a corresponding driven tooth 22. As the gears continue to rotate, tooth contact should be maintained until the teeth come out of mesh.

In the ideal case this contact between a drive tooth 16 and a corresponding driven tooth 22 in maintained from the point of initial contact to the point of final contact. However, backlash between mating surfaces of the meshing teeth, as well as clearance between the tip of a tooth of one gear and the root circle of the other gear must be designed into the gear set. Thus manufacturing tolerances and driveline vibrations can give rise to the possibility that tooth contact may be broken momentarily. The momentary breaking of this tooth contact is a cause of gear rattle, which may result in objectionable noise.

A gear rattle detector 28 includes a non-magnetic support 30 which may be formed from plastic or the like. Support 30 holds a magnet 32 which includes a base 34 and first and second arms 36 and 38 respectively extending from base 34. First arm 36 includes at one end thereof a first finger 40 extending inwardly toward the body of drive gear 12. Similarly, second arm 38 includes at one end thereof a second finger 42 extending inwardly toward driven gear 14. In the preferred form of the invention, a small gap is maintained between finger 40 and the body of gear 12, and between finger 42 and the body of gear 14. Fingers 40 and 42 respectively define the north pole N and south pole S of magnet 32.

It is important to note that arms 36 and 38 and their respective fingers 40 and 42 are spaced sufficiently such that they span both root circles 18 and 24. This is to insure that the north and south poles always are adjacent solid body portions of gears 12 and 14 as they rotate.

A coil 44 is wound around base 34 of magnet 32. This coil is connected to the input 46 of a suitable signal conditioner 48 which may be, for example, an amplifier. If gear rattle detector 28 is used in an automotive transmission, the output 50 of signal conditioner 48 might be connected to a circuit for controlling the speed of gears 12 and 14, or the load applied to them; or it might apply sufficient drag to one of the gears, usually the driven gear, to overcome gear rattle. If gear rattle detector 28 is used in a laboratory environment, output 50 might be connected to an oscilliscope, recording device or the like.

As noted above, gear teeth 16 and 22 establish contact as they come into mesh. This contact should be maintained throughout the period during which they remain in mesh. If contact is broken during this period, gear rattle and attendant objectionable noise could result. Gear rattle detector 28 senses when this contact is broken.

Magnet 32 establishes a magnetic flux path from finger 40 through arm 36, base 34, arm 38, and finger 42, across a small gap to the body of gear 14, through whichever teeth 16 and 22 are in mesh, to the body of gear 12, and across a small gap to finger 40. This provides a predetermined flux across teeth 16 and 22, which serves as a reference. Any change in the flux will be sensed by gear rattle detector 28 when tooth contact is broken momentarily.

So long as a given tooth 16 remains in meshing contact with its corresponding tooth 22, there will be no change in the flux density. If this contact is broken, however, a change in the flux produces a current in coil 44. This current acts as a signal to the input 46 of signal conditioner 48, and serves as an indication that gear rattle is present in gear set 10.

As noted above, if gear rattle detector 8 is used in an automotive transmission the output 50 of signal conditioner 48 may control corrective action to reduce or indeed eliminate gear rattle. A separate gear rattle detector 28 could be used with each gear set in the transmission to identify which of them is producing objectionable gear rattle, and at what speeds and loads etc. it is being produced.

Those skilled in the art will appreciate that the gear rattle detector of this invention incorporates a magnetic pick-up which is simple, rugged, inexpensive and easy to construct.

It should be understood that while the preferred embodiment of this invention has been shown and described, it is to be considered as illustrative and may be modified by those skilled in the art. It is intended that the claims herein cover all such modifications as may fall within the spirit and scope of the invention.

What is claimed is:

1. Gear transmission apparatus comprising a drive gear defining drive gear teeth extending from a root circle thereof, a driven gear defining driven gear teeth extending from a root circle thereof, said drive and driven gear teeth moving into meshing contact at an initial contact point and out of meshing contact at a final contact point as said gears rotate, and means sensing a change in magnetic flux density across said teeth for detecting a break in said meshing contact between said initial and final contact points.

2. The apparatus of claim 1, said means including a magnetic pick-up having north and south magnetic poles, said poles being spaced sufficiently such that they span the root circles of said gears, whereby a magnetic flux path is established across the root circles and through the drive and driven gear teeth in meshing contact.

3. The apparatus of claim 2, said magnetic pick-up being oriented such that said poles are on a line of centers intersecting the axes of rotation of said gears.

4. The apparatus of claim 2, said magnetic pick-up including a base, a first arm extending from said base and defining said north magnetic pole, a second arm extending from said base and defining said south magnetic pole, said north and south magnetic poles respectively being oriented adjacent the bodies of said drive and driven gears, and a coil wound around said base.

5. The apparatus of claim 4, further comprising a signal conditioner, said coil developing an input signal for said signal conditioner when a change in magnetic flux resulting from a break in said meshing contact is sensed.

6. A gear tooth contact detector for use with a gear set having meshing driving and driven gears, each of said gears having a body including teeth extending outwardly beyond a root circle thereof, said gear tooth contact detector comprising a magnetic pick up including a base, a first arm extending from said base including a first finger oriented adjacent the body of the drive gear, a second arm extending from said base including a second finger oriented adjacent the body of the driven gear, and a coil wound around said base, said first and second fingers respectively defining north and south magnetic poles spaced sufficiently such that they span the meshing teeth extending beyond the root circles of said gears and provides a magnetic flux path across said meshing teeth, and a signal conditioner, said coil developing an input signal for said signal conditioner when a change in said magnetic flux is sensed thereby indicating a break in the meshing contact of the teeth.

* * * * *